United States Patent [19]

Linder et al.

[11] 3,895,934
[45] July 22, 1975

[54] DINITROPHENYLENEDIAMINES AS HERBICIDES

[75] Inventors: Jerome Linder, Westfield, N.J.;
Edward D. Weil, Hastings-on-Hudson, N.Y.

[73] Assignee: Hooker Chemicals & Plastics Corporation, Niagara Falls, N.Y.

[22] Filed: Feb. 27, 1970

[21] Appl. No.: 15,301

Related U.S. Application Data

[63] Continuation-in-part of Ser. No. 577,154, Sept. 6, 1966, abandoned.

[52] U.S. Cl. .................. 71/121; 260/577; 260/578
[51] Int. Cl. ............................................ A01n 9/20
[58] Field of Search ...................... 71/121; 260/577

[56] References Cited
UNITED STATES PATENTS

| | | | |
|---|---|---|---|
| 3,111,403 | 11/1963 | Soper | 71/121 |
| 3,121,116 | 2/1964 | Pawloski | 71/121 |
| 3,257,190 | 6/1966 | Soper | 71/121 |
| 3,442,639 | 5/1969 | Soper | 71/121 |
| 3,449,111 | 6/1969 | Wright | 71/121 |
| 3,530,184 | 9/1970 | Minieri et al. | 71/121 |

OTHER PUBLICATIONS

Joshi et al. II, "Some Trihalogenated Nitrobenzenes and Their Ders.," Part II (1953).
J. Indian Chem. Soc. 30, No. 8, pp. 548-550 (1953).
Joshi et al., "Reactive Halogenonitrobenzenes and Their Ders." pp. 329-334.

*Primary Examiner*—Glennon H. Hollrah
*Attorney, Agent, or Firm*—Peter F. Casella; John M. Petruncio

[57] ABSTRACT

Compounds of the formula below are useful as herbicides

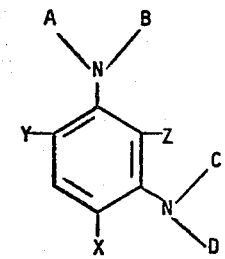

wherein X, Y and Z are substituents independently selected from the group consisting of nitro, fluorine, chlorine, bromine, iodine, hydrogen, and alkyl of 1 to 12 carbon atoms, provided that at least two of said X, Y and Z substituents are nitro; A, B, C and D are substituents independently selected from the group consisting of hydrogen, alkyl of 1 to 12 carbon atoms and alkenyl of 2 to 12 carbon atoms, provided that at most 3 of said A, B, C and D substituents are hydrogen, and further provided that at least one of said A, B, C and D substituents is an alkyl or alkenyl group of from 2 to 12 carbon atoms.

4 Claims, No Drawings

DINITROPHENYLENEDIAMINES AS HERBICIDES

CROSS REFERENCES

This application is a continuation-in-part of Ser. No. 577,154, filed Sept. 6, 1966 now abandoned.

This invention relates to novel dinitrophenylenediamines and the herbicidal uses thereof.

In accordance with this invention, there is provided a compound of the formula:

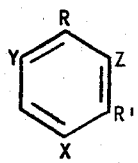

wherein X, Y and Z are substituents independently selected from the group consisting of nitro, fluorine, chlorine, bromine, iodine, hydrogen and alkyl of 1 to 12 carbon atoms, provided that at least two of said X, Y and Z substituents are nitro, R is of the formula:

and R' is of the formula:

wherein A, B, C and D are substituents independently selected from the group consisting of hydrogen, alkyl of 1 to 12 carbon atoms and alkenyl of from 2 to 12 carbon atoms, provided that at most 3 of said A, B, C and D substituents are hydrogen, and further provided that at least one of said A, B, C and D substituents is an alkyl or alkenyl group of from 2 to 12 carbon atoms. In a preferred embodiment of the invention, Y and Z are nitro, and X is selected from the group consisting of chlorine and methyl. In one of the more preferred embodiments of the invention, Y and Z are nitro, X is selected from the group consisting of chlorine and methyl, A and B are independently selected from the group consisting of hydrogen, alkyl of 1 to 4 carbon atoms and alkenyl of from 2 to 4 carbon atoms, and C and D are hydrogen. In another of the more preferred embodiments of the invention, Y and Z are nitro, X is selected from the group consisting of chlorine and methyl, and A, B, C and D are independently selected from the group consisting of hydrogen, ethyl, n-propyl, isopropyl, and sec-butyl, provided that no more than one substituent selected from the group consisting of isopropyl and sec-butyl may be bonded to any one nitrogen atom.

The compounds of this invention provide a novel process for the control of grasses and broadleaf plants and weeds when applied in a herbicidally effective amount to the locus of said plants either prior to or after germination. When so applied at an application rate of from about 0.2 to 100 pounds per acre, preferably at a rate of from about 1 to about 16 pounds per acre, weed grasses and broadleaf weeds are eliminated, and the germination of the seeds of the aforementioned plants is inhibited.

The herbicidal compounds of this invention can be used alone or as part of solid or emulsified formulations of various types. They may be formulated as emulsifiable concentrates or wettable powders for sprays, as granules, or as dispersions on carriers such as peat moss or vermiculite. Because said compounds are relatively insoluble in water, it is preferred to use a wetting agent in the formulation thereof.

The compounds of this invention were prepared by three methods which, for the purpose of convenience in referring to Table 1, which describes the preparation and properties of said compounds, will be referred to as methods A, B and C. In method A, a mixture of one mole of a halogenated aromatic compound (whose structure is defined by the "Substituents of One of the Reactants" column of Table I) and an amine (whose structure and concentration is defined by the "Other Reactants and Concentrations Thereof" column of said Table), and a solvent quantity centimeters of ethanol were placed in an autoclave, heated to the temperature specified in the "Temperature" column of Table I, and kept at said temperature for a period of time defined by the "Time in Hours" column of Table I. Thereafter, the autoclave was opened, the contents thereof were evaporated to dryness, extracted with a solvent quantity of benzene, and washed with water to remove amine hydrochloride. The benzene solution was evaporated to dryness, yielding a solid which then recrystallized by the solvent specified in the "Solvents Used for Crystallization" column of Table I, yielding a compound with the physical properties specified in Table I. In method B one mole of the chlorinated aromatic compound was dissolved in a solvent quantity of refluxing ethanol. To this solution was added the amine, and the mixture was heated at the specified temperature for the specified time. The entire contents were then evaporated to dryness, extracted with a solvent quantity of benzene and washed with water. The benzene solution was evaporated to dryness yielding a solid which was then recrystallized by the specified solvent. In method C, one mole of the chlorinated aromatic compound was added slowly to the specified amount of the specified amine. The mixture was then heated for the specified time at the specified temperature, and the recovery procedure or method B was thereafter used.

After said compounds were prepared, they were subjected to herbicidal testing. Sandy topsoil was run through a 30 mesh sieve. The sieved topsoil was then poured into 14 inches X 20 inches X 4 inches wooden flats until it was three-fourths inch from the tops thereof, and was moistened. The crops to be tested were then planted in rows in said flats, said rows equidistant from each other. One-half inch of the topsoil was then added to said flats, and the weeds to be tested were then planted in rows in said flats. One-quarter inch of topsoil was then added to said flats, the soil in said flats was then moistened. For pre-emergence testing, chemicals to be tested were sprayed onto said soil at the specified concentrations immediately after the planting of said crops and weeds. For post-emergence testing, said chemicals were sprayed onto said flats from 7 to 10 days after planting, when the crops and weeds had emerged. The results of both pre- and post-emergence testing appear in Table I. The pre- and post-application rate is given in pounds per acre. The results are on a scale from 0–10, wherein 0 equals 0 percent kill and 10 equals 100 percent kill.

To more specifically illustrate the invention, the following examples, which are merely illustrative and are not to be deemed limitative of the invention, are presented in Table I.

Table I

| | Substituents On Compound Obtained[1] | | Substituents On One Of The Reactants[2] | | | | Other Reactants And Relative Amounts Thereof | Time In Hours | Temperature | Solvents Used For Crystallization | Preparation Method[3] | Melting Point |
|---|---|---|---|---|---|---|---|---|---|---|---|---|
| Ex. | R | R' | E | J | K | L | | | | | | |
| 1 | $N(C_2H_5)_2$ | $N(C_2H_5)_2$ | Cl | Cl | Cl | $NO_2$ | 10M, $(C_2H_5)_2NH$ | 24 | Reflux | $CH_3OH$ | C | 71–3°C |
| 2 | $NHC_4H_9$—sec | $NH_2$ | Cl | $NO_2$ | $NH_2$ | $CH_3$ | 5M, $C_4H_9NH_2$-sec | 12 | Reflux | Ethanol | B | 154–6°C |

| | Color | % Yield | % Nitrogen/Chlorine Found | Empirical Formula | Application Rate | | Millet | Cabbage | Crab-Grass | Tomato | Rye | Cucumber | Pigweed | Alfalfa |
|---|---|---|---|---|---|---|---|---|---|---|---|---|---|---|
| 1 | Yellow | 66 | 15.6/9.9 | $C_{14}H_{21}ClN_4O_4$ | Pre | 8 | 10 | 0 | 10 | 0 | 10 | 0 | — | — |
| | | | | | Post | 4 | 0 | 0 | 8 | 0 | 4 | 2 | — | — |
| 2 | Orange | 90 | 20.8/— | $C_{11}H_{16}N_4O_4$ | Pre | 2 | 10 | — | 10 | 0 | 10 | 0 | 8 | — |
| | | | | | Pre | 4 | 9 | — | 10 | 0 | 10 | 2 | 8 | — |
| | | | | | Post | 2 | 0 | — | 8 | 0 | 2 | 2 | 10 | — |
| | | | | | Post | 4 | 2 | — | 10 | 0 | 7 | 2 | 10 | — |

| | Substituents On Compound Obtained[1] | | Substituents On One Of The Reactants[2] | | | | Other Reactants And Relative Amounts Thereof | Time In Hours | Temperature | Solvents Used For Crystallization | Preparation Method[3] | Melting Point |
|---|---|---|---|---|---|---|---|---|---|---|---|---|
| Ex. | R | R' | E | J | K | L | | | | | | |
| 3 | $N(C_2H_5)_2$ | $NH_2$ | Cl | $NO_2$ | $NH_2$ | $CH_3$ | 5M, $(C_2H_5)_2NH$ | 12 | Reflux | Ethanol | B | 108–111°C |
| 4 | $N(C_3H_7$—$n)_2$ | $NH_2$ | Cl | $NO_2$ | $NH_2$ | $CH_3$ | 5M, $(nC_3H_7)_2NH$ | 12 | Reflux | Ethanol | B | 129–30°C |
| 5 | $N(C_3H_7$—$n)_2$ | $N(C_3H_7$—$n)_2$ | Cl | $NO_2$ | Cl | $CH_3$ | 10M, $(nC_3H_7)_2NH$ | 48 | 150°C | Oil | A | — |
| 6 | $NHC_3H_7$—n | $NHC_3H_7$—n | Cl | $NO_2$ | Cl | $CH_3$ | 6M, $(nC_3H_7)_2NH$ | 48 | 160°C | Oil | A | — |
| 7 | $N(C_2H_5)_2$ | $N(C_2H_5)_2$ | Cl | $NO_2$ | Cl | $CH_3$ | 6M, $(C_2H_5)_2NH$ | 48 | 160°C | Oil | A | — |

| | Color | % Yield | % Nitrogen/Chlorine Found | Empirical Formula | Application Rate | | Millet | Cabbage | Crabgrass | Tomato | Rye | Cucumber | Pigweed | Alfalfa |
|---|---|---|---|---|---|---|---|---|---|---|---|---|---|---|
| 3 | Orange | 98 | 20.3/— | $C_{11}H_{16}N_4O_4$ | Pre | 2 | 6 | — | 9 | 0 | 10 | 2 | 8 | — |
| | | | | | Pre | 4 | 10 | — | 10 | 0 | 10 | 0 | 10 | — |
| | | | | | Post | 2 | 3 | — | 8 | 0 | 0 | 5 | 10 | — |
| | | | | | Post | 4 | 4 | — | 10 | 2 | 0 | 4 | 10 | — |
| 4 | Orange | 98 | 18.3/— | $C_{13}H_{20}N_4O_4$ | Pre | 2 | 9 | — | 9 | 0 | 9 | 0 | 3 | — |
| | | | | | Pre | 4 | 10 | — | 9 | 0 | 10 | 0 | 10 | — |
| | | | | | Post | 2 | 3 | — | 10 | 0 | 5 | 5 | 10 | — |
| | | | | | Post | 4 | 4 | — | 9 | 4 | 5 | 6 | 10 | — |
| 5 | Brownish Yellow | 98 | 14.4/— | $C_{19}H_{32}N_4O_4$ | Pre | 4 | 7 | — | 3 | 3 | 9 | 0 | 10 | — |
| | | | | | Post | 4 | 6 | — | 6 | 0 | 0 | 2 | 0 | — |
| 6 | Brownish Black | 95 | | $C_{13}H_{20}N_4O_4$ | Pre | 4 | 0 | — | 0 | 0 | 0 | 0 | 0 | — |
| | | | | | Post | 4 | 6 | — | 2 | 2 | 0 | 2 | 0 | — |
| 7 | Brownish Yellow | 71 | 16.9/— | $C_{15}H_{24}N_4O_4$ | Pre | 4 | 10 | — | 3 | 0 | 10 | 4 | 10 | — |
| | | | | | Post | 4 | 6 | — | 6 | 0 | 4 | 0 | 0 | — |

| | Substituents On Compound Obtained[1] | | Substituents On One Of The Reactants[2] | | | | Other Reactants And Relative Amounts Thereof | Time In Hours | Temperature | Solvents Used For Crystallization | Preparation Method[3] | Melting Point |
|---|---|---|---|---|---|---|---|---|---|---|---|---|
| Ex. | R | R' | E | J | K | L | | | | | | |
| 8 | $N(CH_3)_2$ | $N(CH_3)_2$ | Cl | $NO_2$ | Cl | $CH_3$ | 6M, $(CH_3)_2NH$ | 12 | 150–160°C | Hexane | A | 85–7°C |
| 9 | $NH_2$ | $NH_2$ | Cl | $NO_2$ | Cl | $CH_3$ | 6M, $NH_3$ | 24 | 150°C | | A | 262°C |
| 10 | $NHC_3H_7$—n | $NH_2$ | Cl | $NO_2$ | $NH_2$ | $CH_3$ | 1M, $nC_3H_7NH_2$ | 12 | Reflux | Benzene | B | 125–9°C |
| 11 | $N(CH_3)_2$ | $N(CH_3)_2$ | Cl | $NO_2$ | Cl | Cl | 9M, $(CH_3)_2NH$ | 12 | 100°C | Hexane | A | 77–9°C |
| 12 | $N(C_2H_5)_2$ | $N(C_2H_5)_2$ | Cl | $NO_2$ | Cl | Cl | 10M, $(C_2H_5)_2NH$ | 12 | Reflux | $CH_3OH$ | C | 91–3°C |

| | Color | % Yield | % Nitrogen/Chlorine Found | Empirical Formula | Application Rate | | Millet | Cabbage | Crabgrass | Tomato | Rye | Cucumber | Pigweed | Alfalfa |
|---|---|---|---|---|---|---|---|---|---|---|---|---|---|---|
| 8 | Yellow | 78.5 | 20.9/— | $C_{11}H_{16}N_4O_4$ | Pre | 4 | 10 | — | 2 | 0 | 9 | 10 | 4 | — |
| | | | | | Post | 4 | 0 | — | 0 | 0 | 0 | 0 | 0 | — |
| 9 | Yellow | 50 | 26.7/— | $C_7H_8N_4O_4$ | Pre | 4 | 2 | — | 8 | 0 | 6 | 0 | 0 | — |
| | | | | | Post | 4 | 4 | — | 9 | 2 | 0 | 2 | 0 | — |
| 10 | Orange | 10 | 21.8/— | $C_{10}H_{14}N_4O_4$ | Pre | 4 | 10 | — | 3 | 9 | 8 | 5 | 10 | — |
| | | | | | Post | 4 | 5 | — | 8 | 0 | 0 | 4 | 0 | — |
| 11 | Dark Tan | 84 | 18.83/12.1 | $C_{10}H_{13}ClN_4O_4$ | Pre | 8 | 10 | 0 | — | 0 | 8 | 0 | — | 0 |
| | | | | | Pre | 16 | 10 | — | — | 0 | 10 | — | — | — |
| | | | | | Post | 4 | 0 | 0 | — | 0 | 0 | 0 | — | 0 |
| 12 | Yellow | 69 | 15.6/10.0 | $C_{11}H_{21}ClN_4O_4$ | Pre | 8 | 8 | 0 | — | 0 | 8 | 0 | 3 | 0 |

Table I — Continued

| Application Rate | Millet | Cabbage | Crab-Grass | Tomato | Rye | Cucumber | Pigweed | Alfalfa |
|---|---|---|---|---|---|---|---|---|
| Post 4 | 0 | 0 | — | 0 | 0 | 0 | | |
| Pre 1 | 0 | 0 | — | 0 | 0 | 0 | 0 | 0 |
| Pre 2 | 7 | 0 | — | 0 | 2 | | 0 | 0 |
| Pre 4 | 9 | 0 | — | 0 | 5 | | 0 | 0 |
| Pre 16 | 9 | 0 | — | 0 | 10 | | 3 | 0 |

| | Substituents On Compound Obtained[1] | | Substituents On One Of The Reactants[2] | | | | Other Reactants And Relative Amounts Thereof | Time In Hours | Temperature | Solvents Used For Crystallization | Preparation Method[3] | Melting Point |
|---|---|---|---|---|---|---|---|---|---|---|---|---|
| Ex. | R | R' | E | J | K | L | | | | | | |
| 13 | NHC(CH$_3$)$_3$ | NHC(CH$_3$)$_3$ | Cl | NO$_2$ | Cl | Cl | 10M, t—C$_4$H$_9$NH$_2$ | 12 | Reflux | Hexane | B | 168–70°C |
| 14 | N(C$_3$H$_7$—n)$_2$ | N(CH$_3$)$_2$ | N(C$_3$H$_7$—n)$_2$ | NO$_2$ | Cl | Cl | 3M, (CH$_3$)$_2$NH | 16 | 100°C | Hexane | A | 67–69.5°C |
| 15 | N(C$_4$H$_9$—sec)$_2$ | NH$_2$ | Cl | NO$_2$ | NH$_2$ | Cl | 3M, (iso—C$_4$H$_9$)$_2$NH | 12 | Reflux | Ethanol | B | 133–5°C |
| 16 | N(CH$_2$CH=CH$_2$)$_2$ | NH$_2$ | Cl | NO$_2$ | NH$_2$ | Cl | 3M, (CH$_2$=CHCH$_2$)$_2$NH | 12 | Reflux | Hexane | B | 78–80°C |
| 17 | NHC$_4$H$_9$—sec | NH$_2$ | Cl | NO$_2$ | NH$_2$ | Cl | 3M, sec C$_4$H$_9$NH$_2$ | 12 | Reflux | Hexane-Benzene | B | 126–7.5°C |
| 18 | NHCH$_2$CH$_2$OH | NH$_2$ | Cl | NO$_2$ | NH$_2$ | Cl | 3M, NH$_2$CH$_2$CH$_2$OH | 12 | Reflux | — | B | 196–9°C |

| Ex. | Color | % Yield | % Nitrogen/Chlorine Found | Imperical Formula | Application Rate | Millet | Cabbage | Crabgrass | Tomato | Rye | Cucumber | Pigweed | Alfalfa |
|---|---|---|---|---|---|---|---|---|---|---|---|---|---|
| 13 | Yellow | 80 | 16.6/10.2 | C$_{14}$H$_{21}$ClN$_4$O$_4$ | Pre 1 | 0 | — | 0 | 0 | 0 | 0 | 0 | — |
| | | | | | Pre 4 | 0 | — | 0 | 0 | 0 | 0 | 0 | — |
| | | | | | Post 2 | 0 | — | 9 | 0 | 0 | 0 | 0 | — |
| | | | | | Post 4 | 0 | — | 9 | 0 | 0 | 0 | 10 | — |
| 14 | Tannish Yellow | 45 | 15.6/10.2 | C$_{14}$H$_{21}$ClN$_4$O$_4$ | Pre 8 | 9 | — | 5 | 0 | 9 | 0 | 3 | — |
| | | | | | Post 4 | 0 | — | 8 | 0 | 0 | 3 | 0 | — |
| 15 | Orange | 74 | 15.83/10.4 | C$_{14}$H$_{21}$ClN$_4$O$_4$ | Pre 4 | 10 | — | 10 | 0 | 10 | 0 | 5 | — |
| | | | | | Post 8 | 9 | — | 4 | 3 | 3 | 8 | 3 | — |
| 16 | Tannish Yellow | 84 | 17.4/11.2 | C$_{12}$H$_{13}$ClN$_4$O$_4$ | Pre 4 | 10 | — | 10 | 0 | 10 | 0 | 10 | — |
| | | | | | Post 4 | 8 | — | 8 | 3 | 3 | 8 | 0 | — |
| 17 | Tannish Yellow | 83 | 19.2/12.1 | C$_{10}$H$_{13}$ClN$_4$O$_4$ | Pre 4 | 0 | — | 0 | 0 | 0 | 0 | 0 | — |
| | | | | | Post 4 | 6 | — | 9 | 7 | 3 | 8 | 0 | — |
| 18 | Yellow | 100 | 20.2/12.8 | C$_8$H$_9$ClN$_4$O$_5$ | Pre 4 | 0 | — | 0 | 0 | 0 | 0 | 0 | — |
| | | | | | Post 4 | 0 | — | 0 | 0 | 0 | 0 | 0 | — |

| | Substituents On Compound Obtained[1] | | Substituents On One Of The Reactants[2] | | | | Other Reactants And Relative Amounts Thereof | Time In Hours | Temperature | Solvents Used For Crystallization | Preparation Method[3] | Melting Point |
|---|---|---|---|---|---|---|---|---|---|---|---|---|
| Ex. | R | R' | E | J | K | L | | | | | | |
| 19 | NHC$_3$H$_7$—n | NH$_2$ | Cl | NO$_2$ | NH$_2$ | Cl | 3M, nC$_3$H$_7$NH$_2$ | 12 | Reflux | Ethanol | B | 142–44°C |
| 20 | NHC$_3$H$_7$—iso | NH$_2$ | Cl | NO$_2$ | NH$_2$ | Cl | 3M, iso—C$_3$H$_7$NH$_2$ | 48 | Reflux | CH$_3$OH | B | 154–5.5 |
| 21 | N(C$_4$H$_9$—n)$_2$ | NH$_2$ | Cl | NO$_2$ | NH$_2$ | Cl | 3M, (nC$_4$H$_9$)$_2$NH | 12 | Reflux | Ethanol | B | 106–8°C |
| 22 | N(C$_3$H$_7$—n)$_2$ | NH$_2$ | Cl | NO$_2$ | NH$_2$ | Cl | 3M, (nC$_3$H$_7$)$_2$NH | 12 | Reflux | Ethanol | B | 120–2°C |
| 23 | N(C$_2$H$_5$)$_2$ | NH$_2$ | Cl | NO$_2$ | NH$_2$ | Cl | 3M, (C$_2$H$_5$)$_2$NH | 12 | Reflux | Ethanol | B | 110–12°C |

| Ex. | Color | % Yield | % Nitrogen/Chlorine Found | Empirical Formula | Application Rate | Millet | Cabbage | Crabgrass | Tomato | Rye | Cucumber | Pigweed | Alfalfa |
|---|---|---|---|---|---|---|---|---|---|---|---|---|---|
| 19 | Yellow | 95 | 20.63/12.9 | C$_9$H$_{11}$ClN$_4$O$_4$ | Pre 4 | 0 | — | 10 | 3 | 9 | 5 | 5 | — |
| | | | | | Post 4 | 0 | — | 9 | 4 | 3 | 7 | 5 | — |
| 20 | Yellow Orange | 80 | 19.9/12.8 | C$_9$H$_{11}$ClN$_4$O$_4$ | Pre 4 | 10 | — | 10 | 7 | 10 | 0 | 8 | — |
| | | | | | Post 4 | 6 | — | 9 | 3 | 7 | 5 | 0 | — |
| 21 | Yellow Orange | 84 | 16.0/10.2 | C$_{14}$H$_{21}$ClN$_4$O$_4$ | Pre 4 | 9 | — | 0 | 0 | 8 | 0 | 0 | — |
| | | | | | Post 4 | 10 | — | 9 | 2 | 7 | 4 | 0 | — |
| 22 | Yellow Orange | 85 | 17.4/11.2 | C$_{12}$H$_{17}$ClN$_4$O$_4$ | Pre 4 | 10 | — | 10 | 3 | 10 | 0 | 7 | — |
| | | | | | Post 4 | 9 | — | 9 | 3 | 9 | 7 | 0 | — |
| 23 | Orange | 95 | 18.7/12.1 | C$_{10}$H$_{13}$ClN$_4$O$_4$ | Pre 4 | 10 | — | 10 | 3 | 10 | 0 | 7 | — |
| | | | | | Post 4 | 5 | — | 9 | 3 | 5 | 3 | 0 | — |
| | | | | | 10 | — | 8 | 0 | 8 | 0 | 8 | | — |

| Substituents On Compound Obtained[1] | Substituents On One Of The Reactants[2] | Other Reactants And Relative Amounts Thereof | Time In Hours | Temperature | Solvents Used For Crystallization | Preparation Method[3] | Melting Point |
|---|---|---|---|---|---|---|---|

Table I – Continued

| Ex. | R | R' | E | J | K | L | | | | |
|---|---|---|---|---|---|---|---|---|---|---|
| 24 | $NH_2$ | $N(C_3H_7-n)_2$ | $NH_2$ | $NO_2$ | Cl | Cl | 3M, $(nC_3H_7)_2NH$ | 12 | Reflux | Hexane B 73–5°C |
| 25 | $NH_2$ | $N(C_2H_5)_2$ | $NH_2$ | $NO_2$ | Cl | Cl | 3M, $(C_2H_5)_2NH$ | 12 | Reflux | Hexane B 76–8°C |
| 26 | $NH_2$ | $N(C_4H_9-i)_2$ | $NH_2$ | $NO_2$ | Cl | Cl | 3M, $(iso-C_4H_9)_2NH$ | 12 | Reflux | Hexane-Benzene B 84–6°C |
| 27 | $N(C_2H_5)_2$ | $N(C_2H_5)_2$ | $N(C_2H_5)_2$ | $NO_2$ | Cl | Cl | 0.3M, $C_2H_5NH_2$ | 20 | 100°C | $CH_3OH$ A 79.5–82°C |
| 28 | $N(C_2H_5)_2$ | $N(CH_3)_2$ | $N(C_2H_5)_2$ | $NO_2$ | Cl | Cl | 10M, $(CH_3)_2NH$ | 12 | 100°C | $CH_3OH$ A 72–74°C |

| | Color | % Yield | % Nitrogen/ Chlorine Found | Empirical Formula | Application Rate | Millet | Cabbage | Crab-grass | To-mato | Rye | Cucum-ber | Pig-weed | Alfalfa |
|---|---|---|---|---|---|---|---|---|---|---|---|---|---|
| 24 | Orange | 80 | 17.6/11.1 | $C_{12}H_{17}ClN_4O_4$ | Pre 4 | 8 | — | 6 | 0 | 7 | 0 | 0 | — |
|  |  |  |  |  | Post 4 | 5 | — | 8 | 5 | 0 | 7 | 0 | — |
| 25 | Orangish Brown | 86 | 19.1/12.2 | $C_{10}H_{13}ClN_4O_4$ | Pre 4 | 9 | — | 7 | 0 | 9 | 0 | 0 | — |
|  |  |  |  |  | Post 4 | 0 | — | 9 | 3 | 0 | 4 | 0 | — |
| 26 | Yellowish Bronze | 81.5 | 16.1/10.5 | $C_{14}H_{21}ClN_4O_4$ | Pre 4 | 7 | — | 4 | 0 | 5 | 0 | 10 | — |
|  |  |  |  |  | Post 4 | 6 | — | 7 | 0 | 0 | 2 | 0 | — |
| 27 | Yellow | 48 | 17.45/11.1 | $C_{12}H_{17}ClN_4O_4$ | Pre 8 | 7 | — | 0 | 0 | 7 | 0 | 0 | — |
|  |  |  |  |  | Post 4 | 0 | — | 3 | 3 | 0 | 3 | 0 | — |
| 28 | Yellow | 43 | 16.8/11.0 | $C_{12}H_{17}ClN_4O_4$ | Pre 8 | 10 | — | 5 | 0 | 0 | 0 | 0 | — |
|  |  |  |  |  | Post 4 | 0 | — | 0 | 0 | 0 | 3 | 0 | — |

[1]The compound of Example 1 is of the formula 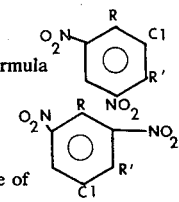 The compounds of Examples 2 – 10 are of the formula 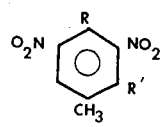

The compounds of Examples 11 – 28 are of the formula, wherein R and R', the substituents on these compounds, are defined in the table.

[2]This reactant is of the formula 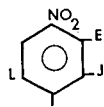, wherein E, J, K, and L are substituents defined in the table. In each instance, the amount of the reactant is one mole. (see footnote 4, infra).

[3]Preparation methods A, B, and C as described on page 3.

[4]This column indicates the amount of amine reactant used in relation to the amount of aromatic reactant used, but does not give the absolute concentration of either. Thus the "lOM" of Example 1, e.g., indicates that for every mole of aromatic reactant used ten moles of amine reactant were used.

Herbicidal compositions employing the compounds of the present invention may be combined with a variety of adjuvants such as formulation adjuvants selected from the group consisting of solvent, liquid carrier and solid carrier. For a more thorough discussion of formulation adjuvants, see U.S. Pat. No. 3,482,019.

Although the above examples and descriptions of this invention have been very specifically illustrated, many other modifications will suggest themselves to those skilled in the art upon a reading of this disclosure. These are intended to be comprehended within the scope of this invention.

What is claimed is:

1. A method for controlling weeds comprising applying, to the locus to be controlled, a herbicidal amount of a compound of the formula

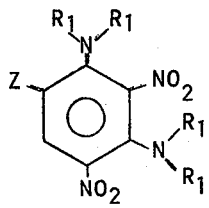

in which Z is lower alkyl, each $R_1$ is selected from the group consisting of hydrogen and lower alkyl.

2. The method for controlling weed growth which comprises applying to the locus of said weeds a phytotoxic amount of the compound $N^3$, $N^3$-diethyl-2,4-dinitro-6-chloro-1,3-phenylenediamine.

3. The method for controlling weed growth which comprises applying to the locus of said weeds a phytotoxic amount of the compound $N^3$, $N^3$-di-n-propyl-2,4-dinitro-6-chloro-1,3-phenylenediamine.

4. A method for controlling weeds comprising applying, to the locus to be controlled, a herbicidal amount of a compound of the formula

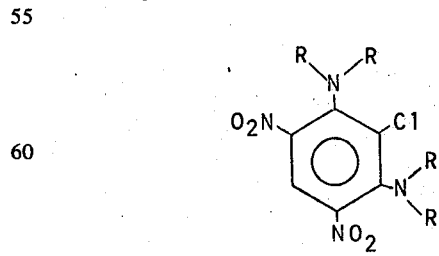

in which each R is selected from the group consisting of hydrogen and lower alkyl, at least one of said R's being a lower alkyl.

* * * * *